United States Patent [19]

Shimoyanagida et al.

[11] Patent Number: 5,477,277
[45] Date of Patent: Dec. 19, 1995

[54] APPARATUS AND METHOD FOR CONTROLLING THE MUTING OF SOUND AND THE DISPLAY OF AUDIO INFORMATION ON A TELEVISION RECEIVER

[75] Inventors: Susumu Shimoyanagida; Yoshifumi Muramoto, both of Nagaokakyo, Japan

[73] Assignee: Mitsubishi Denki Kabushiki Kaisha, Tokyo, Japan

[21] Appl. No.: 185,408

[22] Filed: Jan. 24, 1994

[30] Foreign Application Priority Data

Jan. 26, 1993 [JP] Japan ................................ 5-010417

[51] Int. Cl.[6] .................................................... H04N 5/60
[52] U.S. Cl. ...................... 348/632; 348/738; 348/468; 348/564; 348/589
[58] Field of Search ................................ 348/632, 734, 348/738, 589, 600, 460, 468, 563, 564; H04N 5/60

[56] References Cited

U.S. PATENT DOCUMENTS

| 5,327,176 | 7/1994 | Forler et al. ........................ 348/564 |
| 5,408,273 | 4/1995 | Okamura ............................ 348/632 |

FOREIGN PATENT DOCUMENTS

| 2080887 | 4/1993 | Canada ............................ H04N 7/08 |
| 6165073 | 6/1994 | Japan .............................. H04N 5/60 |

Primary Examiner—Victor R. Kostak
Assistant Examiner—Cheryl Cohen

[57] ABSTRACT

Apparatus and method which commands the displaying of audio information on a television receiver display in the case where it is judged that a sound muting control unit was operated, whereby the audio information is displayed by a single operation of the sound muting control unit.

9 Claims, 4 Drawing Sheets

APPARATUS AND METHOD FOR CONTROLLING THE MUTING OF SOUND AND THE DISPLAY OF AUDIO INFORMATION ON A TELEVISION RECEIVER

BACKGROUND OF THE INVENTION

1. Field of the Invention

The present invention relates to a television receiver for displaying visual images and audio information corresponding to sound which relates to said visual images.

2. Description of Related Art

In North America, there has been provided television broadcasting in a closed caption mode (CC mode) which transmits an image signal and a signal for audio information corresponding to sound. A television receiver adequate to this type of broadcasting is capable of displaying, on its cathode-ray tube, audio information corresponding to sound as well as visual images.

FIG. 1 is a block diagram showing the constitution of the main portions of such a color television receiver. In the drawing, a television signal in the closed caption mode is received by an antenna 101 and then inputted to an RF detector (tuner) circuit 102. The television signal outputted from the RF detector circuit 102 is inputted to an image amplifier circuit 103 and to a closed caption decoder 104. A signal for audio information corresponding to sound, which was obtained through decoding by the closed caption decoder 104, and an image signal outputted from the image amplifier circuit 103 are given to a switching circuit 106, which then selects between the two signals so that the selected signal is given to a display unit 107 composed of, for example, a cathode-ray tube for image display. Signals from an audio muting switch 108 and from an audio information display switch 109 are inputted to a microcomputer 105. The microcomputer 105 is so constituted as to control the image amplifier circuit 103, closed caption decoder 104, and switching circuit 106.

Below, the operation of the color television receiver will be described in accordance with a flow chart of FIG. 2, which shows the content, of control. The television signal in the closed caption mode inputted to the RF detector circuit 102 from the antenna 101 is amplified and detected by the RF detector circuit 102, so as to be inputted to the image amplifier circuit 103 and to the closed caption decoder 104. Through the decoding process, the closed caption decoder 104 picks up a closed caption signal for audio information corresponding to sound, which was given to the closed caption decoder 104 during the vertical retrace interval.

Meanwhile, the image amplifier circuit 103 picks up and amplifies the image signal, which was given to the image amplifier circuit 103 during the horizontal scanning period of the television signal. The closed caption signal, which was picked by the closed caption decoder 104, is written in a memory (not shown) built in the closed caption decoder 104. The closed caption signal written in the memory is read out, under the control of the microcomputer 105, at a predetermined point in the horizontal scanning period.

By controlling the switching circuit 106, the microcomputer 105 selects between an image signal obtained by super-imposing the closed caption signal from tile memory of the closed caption decoder 104 on an original image signal from the image amplifier circuit 103 and the original image signal, so that the selected one is transmitted to the display unit 107. Accordingly, in the case of receiving the image signal obtained by superimposing the closed caption signal, the display unit 107 displays audio information as well as visual images. On the contrary, in the case of receiving the original image signal, the display unit 107 displays visual images only.

While performing such control, the microcomputer 105 also judges whether or not the viewer has selected to receive the television signal in the closed caption mode (S1). If the answer is no, audio information corresponding to sound is not displayed on the display unit 107 (S2). If the answer is yes, it is further judged whether or not the sound muting switch 108 was operated to command the muting of sound (S3). If the answer is yes, it is further judged whether or not the audio information display switch 109 was operated (S4). If the answer is no, the audio information is not displayed (S2). If the answer is yes, the microcomputer 105 controls the switching circuit 106 so that the image signal obtained by superimposing the closed caption signal is given to the display unit 107, thereby displaying the audio information on the display unit 107 (S5).

Subsequently, it is judged whether or not the operation for muting sound and displaying the audio information has been reset (S6), and the audio information remains displayed until resetting is performed. If the resetting is confirmed, the control operation for displaying the audio information is completed.

That is, sound is muted if it is judged that the sound muting switch 108 was operated, thereafter if the audio information display switch 109 is operated, the audio information is displayed on the display unit 107 so that the audio information corresponding to sound can be provided to the viewer without emitting sound. Conversely, if it is judged that the sound muting switch 108 was not operated (S3), it is further judged whether or not the audio information display switch 109 was operated (S7). If the answer is no, the audio information is not displayed. If the answer is yes, the audio information is displayed on the display unit 107 (S5).

Hence, if the audio information display switch 109 only is operated, the audio information is displayed on the display unit 107 with sound, so that even an aurally disabled viewer can be provided with the information corresponding to sound. Subsequently, it is judged whether or not the operation of the audio information display switch 108 has been reset (S6). The audio information remains displayed with sound until resetting is performed. If the resetting is confirmed, the control operation for displaying the audio information is completed.

As described above, in order to display the audio information without sound, it is necessary to operate both the sound muting switch 108 and audio information display switch 109 in succession. Therefore, in the case where a plurality of viewers enjoy television broadcasting by using a single television receiver and one of the viewers, interrupted by a sudden guest arrival or phone call, solely operates the sound muting switch 108 so as to mute sound, other viewers are disadvantageously provided only with visual images without sound. In order to prevent such a disadvantage, the viewer is required to take an intricate procedure of sequentially operating the sound muting switch 108 and audio information display switch 109.

SUMMARY OF THE INVENTION

The present invention was achieved in view of these circumstances. An object of the present invention is to provide a television receiver which can display audio information upon the muting of sound without necessitating an intricate operation by the viewer.

The television receiver according to the present invention comprises a sound muting control unit, a means for judging the presence or absence of a muting command from the sound muting control unit, and a means for commanding the displaying of audio information if it is judged that a muting command is present. Accordingly, by a single operation of the sound muting control unit, the audio information is displayed on the display unit upon the muting of sound.

The above and further objects and features of the invention will more fully be apparent from the following detailed description with accompanying drawings.

DESCRIPTION OF THE PREFERRED EMBODIMENTS

Figure 1:
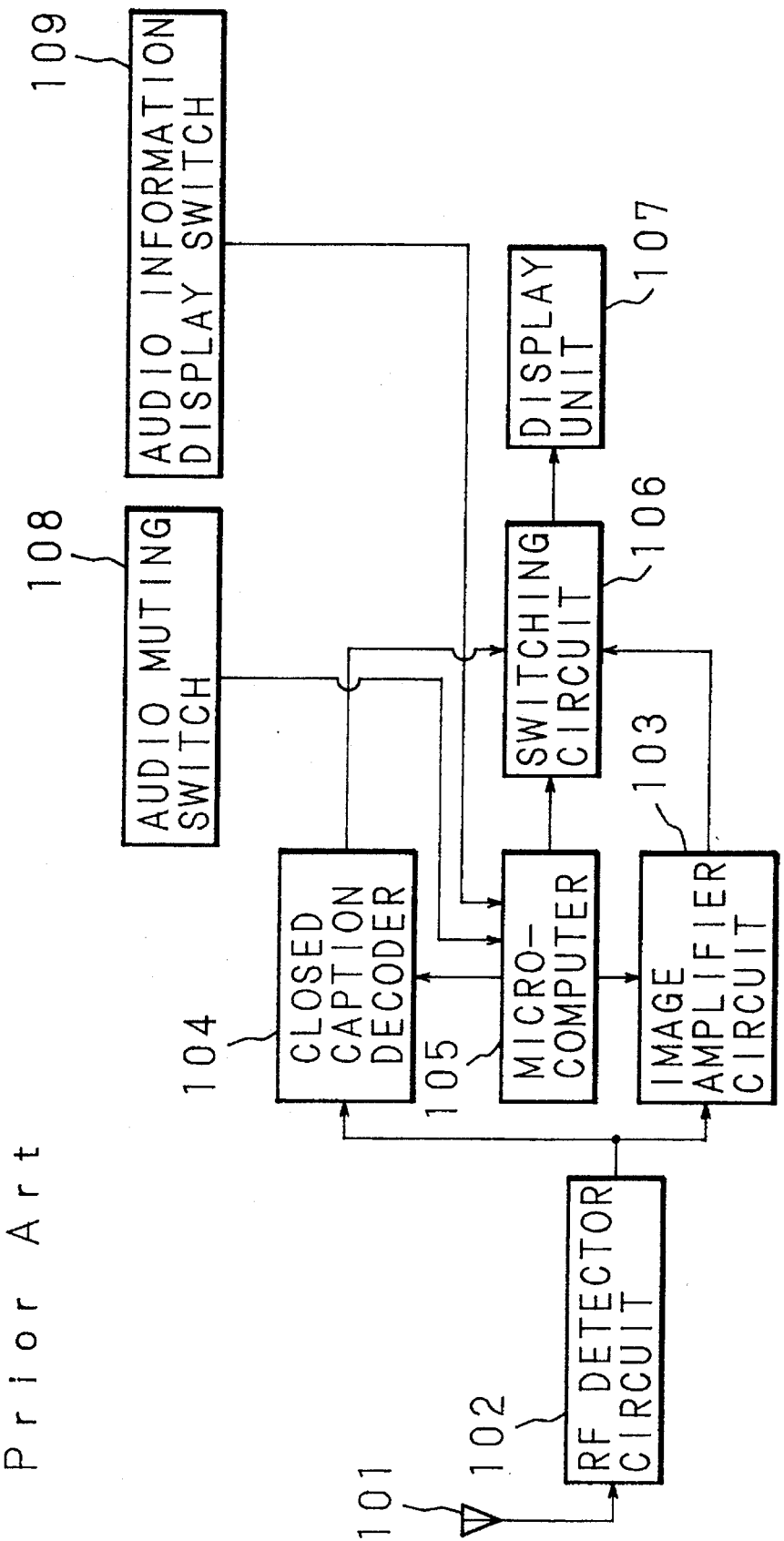
FIG. 1 is a block diagram showing the constitution of the main portions of a conventional color television receiver.
Figure 2:
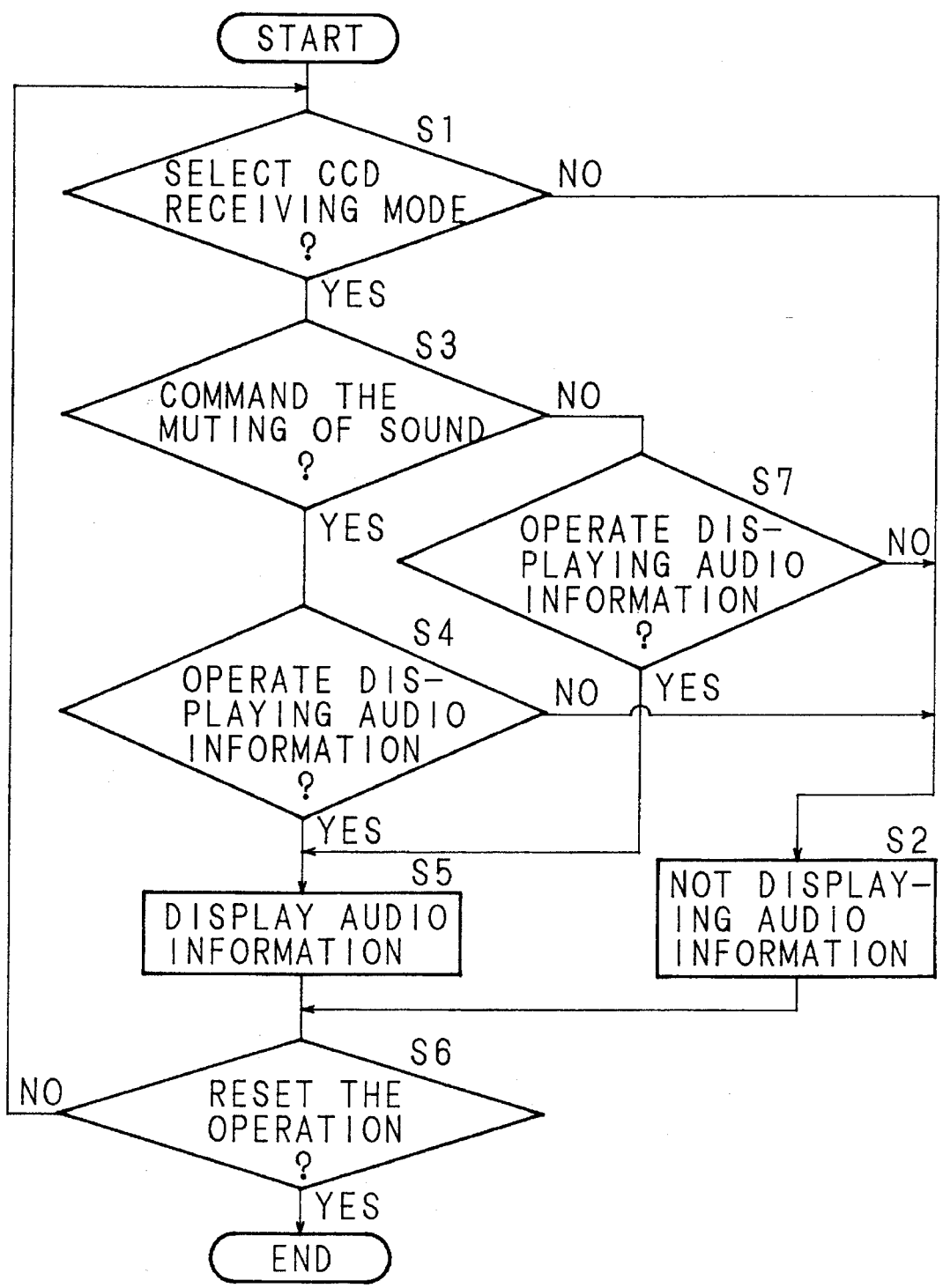
FIG. 2 is another flow chart showing the content of control by the microcomputer.
Figure 3:
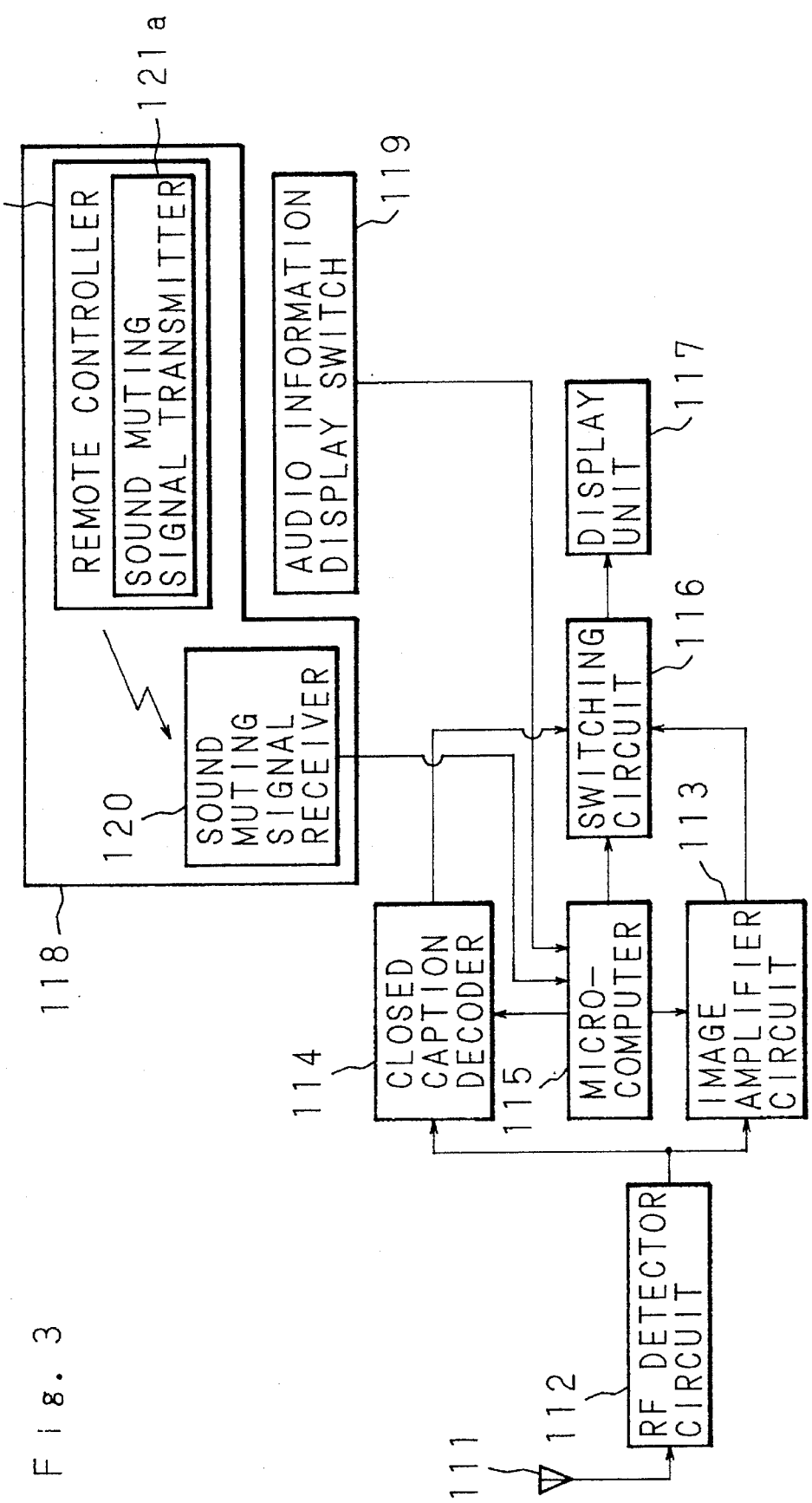
FIG. 3 is a block diagram showing the constitution of the main portions of a television receiver according to the present invention.

Referring now to the drawings, embodiments of the present invention will be described below in detail. FIG. 3 is a block diagram showing the constitution of the main portions of a color television receiver according to the present invention.

A television signal in the closed caption mode is received by an antenna 111 and then inputted to a RF detector (tuner) circuit, 112. The television signal outputted from the RF detector circuit 112 is inputted to an image amplifier circuit 113 and to a closed caption decoder 114. A signal for audio information corresponding to sound, which was obtained through decoding by the closed caption decoder 114, and an image signal outputted from the image amplifier circuit 113 are given to a switching circuit 116.

The signal selected by the switching circuit 116 is given to a display unit 117 composed of, for example, a cathode-ray tube for image display. Signals from a sound muting signal receiver 120 and from an audio information display switch 119 are inputted to a microcomputer 115. The microcomputer 115 is so constituted as to control the image amplifier circuit 113, closed caption decoder 114, and switching circuit 116. A sound muting control unit 118 comprises a sound muting signal transmitter 121a which is composed of a mute button provided in a remote controller 121 and the sound muting signal receiver 120 which is provided in the main body of the television receiver. The sound muting signal receiver 120 is designed to receive a sound muting signal which is transmitted upon the operation of the sound muting signal transmitter 121a.

Figure 4:
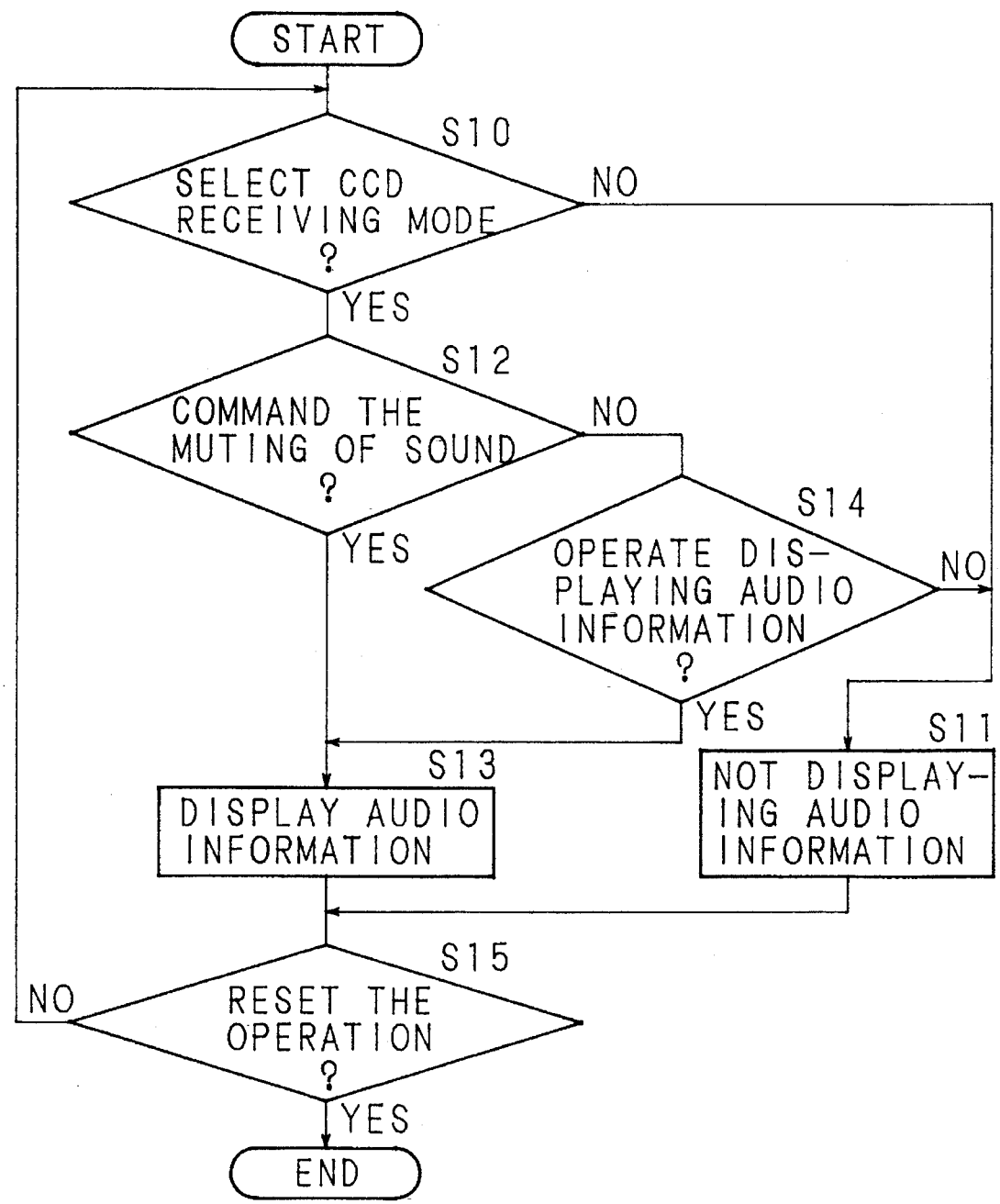
FIG. 4 is a flow chart showing the content of control by a microcomputer.

Below, the operation of the color television receiver thus constituted will be described in accordance with the flow chart of FIG. 4, which shows the content of control by the microcomputer 115. The television signal in the closed caption mode, which was inputted from the antenna 111 to the RF detector circuit 112, is amplified and detected by the RF detector circuit 112, so as to be inputted to the image amplifier circuit 113 and to the closed caption decoder 114. Through the decoding process, the closed caption decoder 114 picks up a closed caption signal for audio information corresponding to sound, which was given to the closed caption decoder 114 during the vertical retrace interval of the television signal in the closed caption mode.

Meanwhile, the image amplifier circuit 113 picks up and amplifies the image signal, which was given to the image amplifier circuit 113 during the horizontal scanning period of the television signal. The closed caption signal, which was picked up by the closed caption decoder 114, is written in a memory (not shown) built in the closed caption decoder 114. The closed caption signal written in the memory is read out, under the control of the microcomputer 115, at a predetermined point in the horizontal scanning period. By controlling the switching circuit 116, the microcomputer 115 selects between an image signal obtained by superimposing the closed caption signal read out of the memory of the closed caption decoder 114 on an original image signal from the image amplifier circuit 113 and the original image signal so that the selected one is transmitted to the display unit 117. Accordingly, in the case of receiving the image signal obtained by superimposing the closed caption signal, the display unit 117 displays audio information as well as visual images. On the contrary, in the case of receiving the original image signal, the display unit 117 displays visual images only.

While performing such control, the microcomputer 115 also judges whether or not the viewer has selected to receive the television signal in the closed caption mode (S10). If the answer is no, the audio information corresponding to sound is not displayed on the display unit 117 (S11). If the answer is yes (S10), the microcomputer 115 subsequently examines the sound muting signal receiver 120 for a signal, operates the sound muting signal transmitter 121a of the remote controller 121 so as to mute sound, and judges whether a command to mute sound is given or not (S12). If the answer is yes, the microcomputer 115 selects the image signal obtained by superimposing the closed caption signal by controlling the switching circuit 116, so that the selected signal is given to the display unit 117, thereby displaying the audio information as well as visual images on the display unit 117 (S13).

Thus, by a single operation of the sound muting signal transmitter 121a, the audio information is displayed on the display unit 117 upon the muting of sound. Consequently, the operation of the audio information display switch, which has conventionally been required after the operation of the sound muting switch so as to display the audio information, is not required any more. The viewer can be provided with the audio information upon the muting of sound.

Conversely, if the microcomputer 115 judges that a command to mute sound is not given (S12), it further judges whether or not the audio information display switch 119 was operated (S14). If the answer is no, the foregoing audio information is not displayed (S11). If the answer is yes, the audio information is displayed in such a manner as described above (S13). Hence, if the audio information display switch 119 only is operated, the visual image and the audio information are displayed on the display unit 117 with sound, so that even an aurally disabled viewer can be provided with the information corresponding to sound.

Subsequently, it is judged whether the operation of the sound muting signal transmitter 121a or of the audio information display switch 119 has been reset or not (S15). The audio information remains displayed without sound until it is judged that the operation of the sound muting signal transmitter 121a has been reset. Or the audio information remains displayed with sound until it is judged that the operation of the audio information switch 119 has been reset. If it is judged that either of the operations has been reset, the control operation for displaying audio information is completed.

Thus, the audio information is displayed at the operation for muting of sound, so that the intricate operation for displaying the audio information can be omitted, thereby preventing the disadvantageous situation in which the viewer is provided with only visual images without sound.

Although the present embodiment has described the case of receiving the television signal in the closed caption mode in the U.S.A., similar effects can also be obtained in other modes by using an appropriate decoder for decoding audio information, provided that it is information on sound. For example, in the case of domestic broadcasting in Japan, the television signal is in the teletext mode. Or in the case of broadcasting in Europe, the television signal is in the teletext mode, whereby a part of tile visual image is blanked so that the information is displayed in the blanked portion. It will be understood that the present invention is not only applicable to color television receivers but also to monochrome television receivers.

Moreover, if a television signal in the closed caption mode for a video tape recorder or a laser disk is used instead of using the television signal in the television broadcasting, similar effects can be obtained. Furthermore, although the sound muting signal is transmitted to the microcomputer from the remote controller in the present embodiment, similar effects can also be obtained even when the signal is given to the microcomputer by the operation of the sound muting switch without the use of the remote controller.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A television receiver comprising:
   a display unit displaying a visual image and audio information corresponding to sound which follows said visual image;
   a sound muting control unit commanding the muting of sound;
   means for judging the presence or absence of a command from said sound muting control unit; and
   means for directing said display unit to display said audio information whenever it is judged that said command is present.

2. A television receiver according to claim 1, wherein said sound muting control unit includes:
   a transmitter transmitting a remote control signal which commands the muting of sound; and
   a receiver receiving said remote control signal.

3. A television receiver according to claim 1, wherein said audio information is information on sound in closed-caption broadcasting.

4. A television receiver according to claim 1, wherein said audio information is information on sound in teletext broadcasting.

5. A method for controlling the muting of sound and the display of audio information on a television receiver comprising:
   displaying a visual image and audio information corresponding to sound which follows said visual image;
   commanding the muting of sound by a muting command;
   judging the presence or absence of said muting command; and
   directing said display unit to display said audio information whenever it is judged that said muting command is present.

6. The method of claim 5, wherein said sound muting command is transmitted from a remote unit.

7. The method of claim 5, wherein said audio information is information on sound in closed-caption broadcasting.

8. The method of claim 5, wherein said audio information is information on sound in teletext broadcasting.

9. In a television receiver which displays a television image and audibly reproduces sounds associated with said image, a method of controlling the muting of said sounds and the display of information which provides a visual representation of the information conveyed by said sounds, comprising the steps of:
   (a) detecting whether a first switch is in a first position, or in a second position;
   (b) detecting, if the result of step (a) detects that said first switch is in said first position, whether a second switch is in a first position commanding the muting of sound or in a second position;
   (c) displaying said information whenever the result of step (b) detects that the second switch is in the first position;
   (d) detecting, if the result of step (b) detects that the second switch is in said second position, whether a third switch is in a first position commanding the display of said information or in a second position;
   (e) displaying, if the third switch is detected, in step (d), to be in said first position, said information;
   (f) not displaying said audio information if: said first switch is in the second position; or, said first switch is in said first position, said second switch is in said second position, and said third switch is in said second position.

* * * * *